No. 879,379. PATENTED FEB. 18, 1908.
J. W. FOWLER, C. S. BARNES & H. G. PETERS.
CREAM SEPARATOR.
APPLICATION FILED DEC. 4, 1905. RENEWED OCT. 18, 1907.
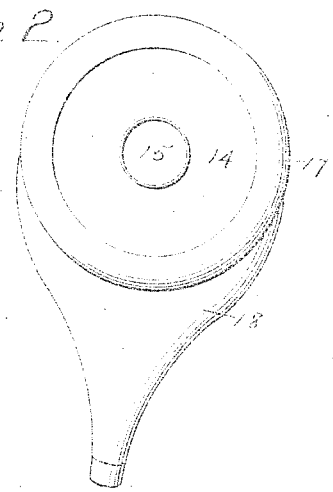
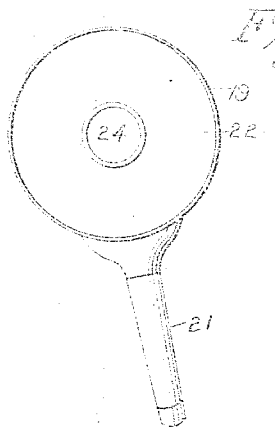
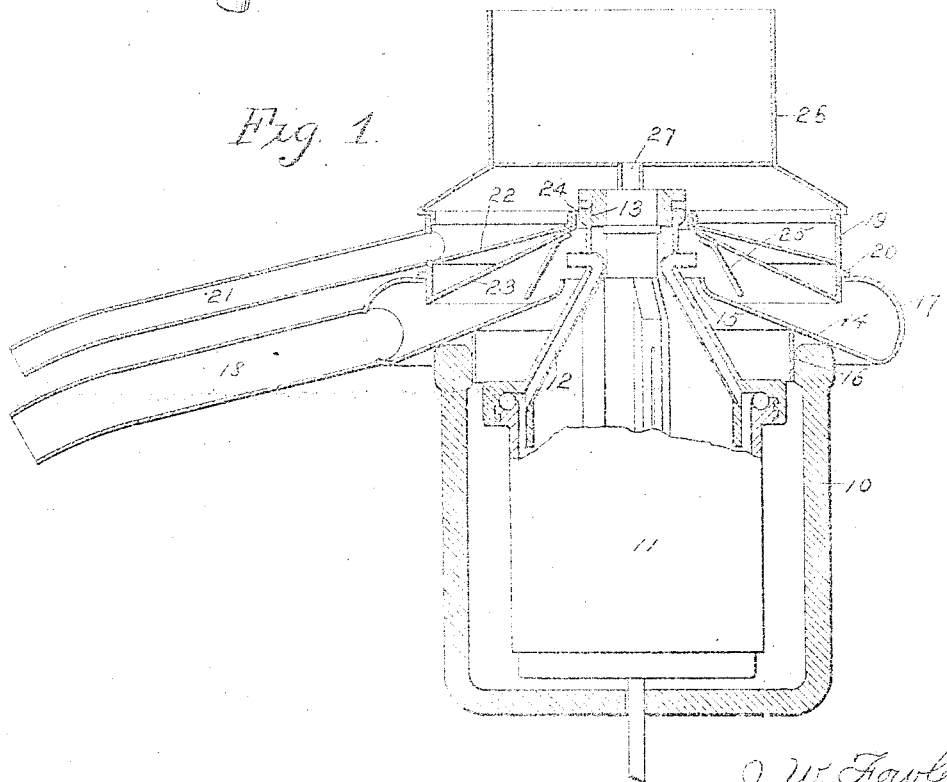

UNITED STATES PATENT OFFICE.

JOSEPH W. FOWLER, CHARLES S. BARNES, AND HENRY G. PETERS, OF GRINNELL, IOWA.

CREAM-SEPARATOR.

No. 879,379.  Specification of Letters Patent.  Patented Feb. 18, 1908.

Application filed December 4, 1905. Serial No. 290,117. Renewed October 18, 1907. Serial No. 398,032.

*To all whom it may concern:*

Be it known that we, JOSEPH W. FOWLER, CHARLES S. BARNES, and HENRY G. PETERS, citizens of the United States, residing at Grinnell, in the county of Poweshiek and State of Iowa, have invented a certain new and useful Cream-Separator, of which the following is a specification.

Our invention relates to the art of centrifugal cream separators and our object is to provide means for preventing the leakage between the rotating separator bowl and the stationary milk pan at the top thereof, which leakage is ordinarily caused by foam and spray in the milk pan passing through the space between the bottom of the milk pan and the exterior of the rotating bowl.

Our invention consists in the construction, arrangement and combination of the stationary milk and cream pans at the top of the separator, whereby the objects contemplated are attained, as hereinafter more fully set forth, pointed out in our claims and illustrated in the accompanying drawings, in which—

Figure 1 shows a central, vertical, sectional view of a centrifugal separator bowl and frame and milk and cream pans arranged thereon and embodying our improvements. Fig. 2 shows a plan view of the milk pan detached, and Fig. 3 shows a similar view of the cream pan.

Referring to the accompanying drawings, we have used the reference numeral 10 to indicate the stationary frame for containing the rotating bowl of a cream separator. Rotatably mounted within the frame is the bowl 11 of ordinary construction and comprising milk discharge tubes 12 and cream discharge openings 13. These parts are of the ordinary construction and comprise in themselves no part of our present invention.

The milk pan comprises a bottom 14 having a central opening at 15, said bottom inclining downwardly and outwardly from the central opening. On the under surface thereof is a flange 16 designed to fit into the interior of the frame 10, thus forming a detachable connection. The bottom 14 extends downwardly and outwardly a considerable distance beyond the flange 16 and at its outer edge portion it is curved upwardly and then inwardly at 17, forming an enlarged circular chamber lying outside of the frame 10. At one side of the milk pan is a discharge spout 18 with its bottom flush with the bottom 14, said spout being at its inner end substantially the same in width as the diameter of the milk pan and tapering at its other end to a small discharge opening.

The cream pan comprises a cylindrical rim 19 formed with an outwardly projecting flange 20 near its lower end, said rim being designed to enter the opening in the top of the milk pan and the flange 20 being designed to rest on top of the part 17 of the milk pan. In one side of the rim 19 is the cream discharge spout 21, its bottom communicates with the interior of the rim 19 at a point above the flange 20. We have provided a double bottom for the cream pan consisting of a top layer 22, its bottom being flush with the bottom of the discharge tube 21 and a bottom layer 23 extending on a straight line from the central opening downwardly to the bottom of the rim 19. Both of these bottom layers extend only to a point near the center of the cream pan, thus forming an opening at 24 through which the top of the rotating bowl projects. Fixed to the part 23 is a number of rods 25, having their upper ends near the central opening 25 and their body portions extended downwardly and outwardly to a point near the bottom 14 of the milk pan. These rods are so arranged that as milk is discharged through the pipes 12, it will strike upon them and be deflected downwardly and outwardly from them. We have also provided a cover for the cream pan and a receptacle for milk indicated by the numeral 26 fitted to the open top of the cream pan and provided with a central tube 27 to discharge milk downwardly in the center of the rotating bowl.

The advantage of having the enlarged chamber 17 surrounding the milk pan and of having a doubled walled partition between the cream pan and milk pan with the bottom of said partition at its outer edge below the upper portion of the enlarged chamber 17, is that a smooth top is provided upon which the skimmed milk strikes when it is discharged from the separator bowl. This milk is deflected by said smooth top wall downwardly and outwardly and the chamber above the top wall and on the outside of it provides room to contain a quantity of foam so that this foam will not back up inside of the skimmed milk pan and overflow around the opening at the center of the bottom of the skimmed milk bowl. It is, therefore, essential to the successful operation of the device that the enlarged chamber surrounding the bowl be higher than the body of the bowl. The advantage of the rods 19 is that the current of milk from the separator bowl, when it strikes said rods, will be broken up and deflected downwardly and outwardly and divided and caused to form a spray which will drive back the foam into the enlarged chamber.

We claim as our invention—

1. In a centrifugal cream separator, the combination of a skimmed milk pan having an enlarged chamber at its periphery, a detachable cover therefor, formed with a double bottom having its lower layer inclined downwardly and outwardly and terminating at a point below the top of the enlarged chamber, the upper layer of said bottom inclined downwardly and outwardly and terminating above the enlarged chamber, a cream pan having said double bottom fixed thereto and a number of rods fixed to the lower layer of said double bottom near its center and inclined downwardly and outwardly to points near the bottom of the skimmed milk pan.

2. In a centrifugal cream separator, the combination of a skimmed milk pan having an enlarged chamber at its periphery, a detachable cover therefor, formed with a double bottom having its lower layer inclined downwardly and outwardly and terminating at a point below the top of the enlarged chamber, the upper layer of said bottom inclined downwardly and outwardly and terminating above the enlarged chamber and a cream pan having said double bottom fixed thereto.

Des Moines, Iowa, Oct. 6, 1905.

JOSEPH W. FOWLER.
CHARLES S. BARNES.
HENRY G. PETERS.

Witnesses:
 W. H. GERILE,
 S. A. PITMAN.